United States Patent [19]

Armstrong

[11] 4,362,404

[45] Dec. 7, 1982

[54] HEAT MEASURING APPARATUS AND METHOD FOR USE IN A CONTINUOUS FLUID STREAM

[75] Inventor: Peter R. Armstrong, Santa Cruz, Calif.

[73] Assignee: Electric Power Research Institute, Inc., Palo Alto, Calif.

[21] Appl. No.: 131,028

[22] Filed: Mar. 17, 1980

[51] Int. Cl.³ ............................................. G01K 17/08
[52] U.S. Cl. ...................................................... 374/39
[58] Field of Search ............. 73/193 R, 193 A, 190 R; 374/39

[56] References Cited

U.S. PATENT DOCUMENTS

| | | | |
|---|---|---|---|
| 3,167,957 | 2/1965 | Ziviani | 73/193 R |
| 4,036,051 | 7/1977 | Fell et al. | 73/193 R |

*Primary Examiner*—Donald O. Woodiel

*Attorney, Agent, or Firm*—Flehr, Hohbach, Test, Albritton & Herbert

[57] ABSTRACT

A technique for use in measuring the amount of heat entering (or being withdrawn from) a continuous fluid stream at a specific location along its path is disclosed herein. This technique utilizes a constant ratio fluid flow divider, e.g., a fluidic bridge, for diverting a portion of the fluid stream along a bypass route. Heat is applied to the diverted stream along its bypass route and, at the same time, the difference in temperature between the diverted stream and the mainstream is detected at predetermined points. From this difference, the amount of heat applied to the diverted stream is controlled so as to substantially eliminate any temperature differential between these points. The amount of heat to accomplish this is proportional by a fixed amount to the heat entering (or leaving) the main stream at the heating (cooling) process to be measured.

4 Claims, 9 Drawing Figures

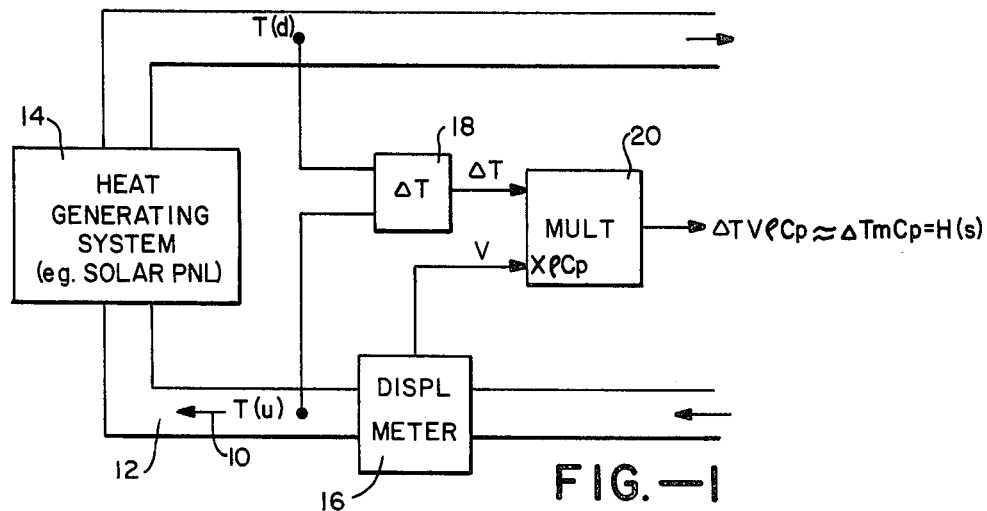
FIG.—1
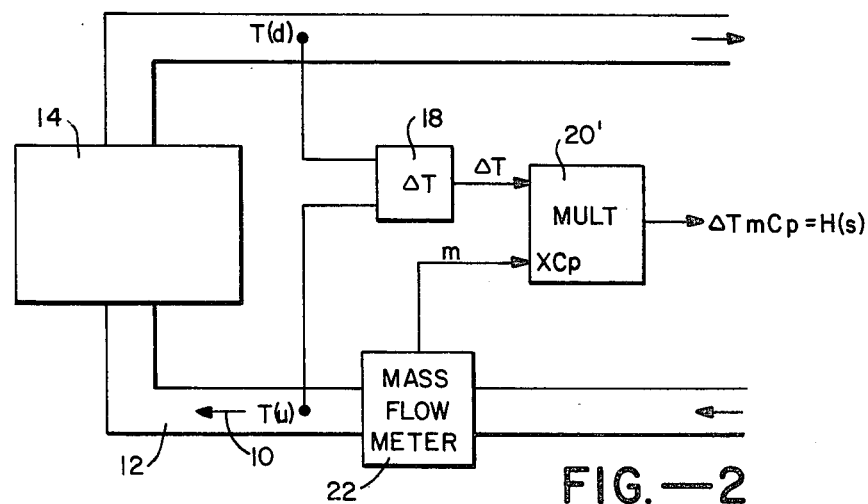
FIG.—2
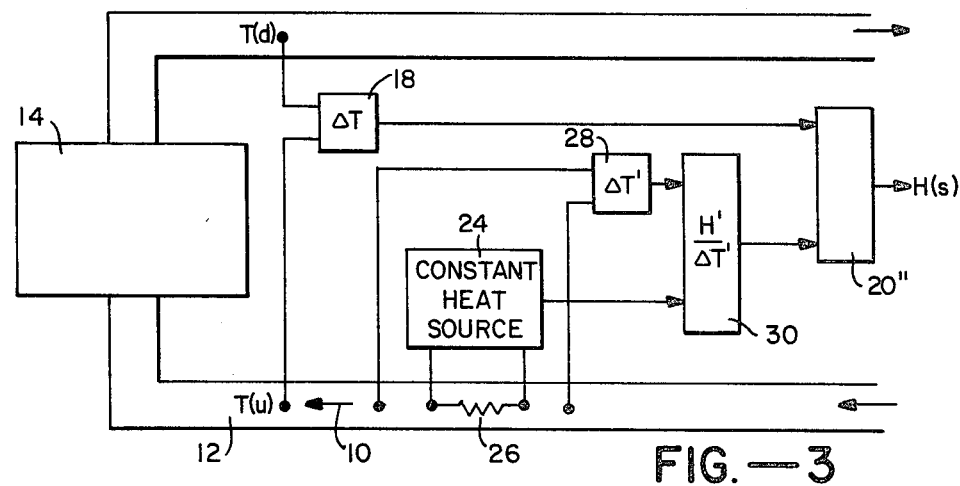
FIG.—3

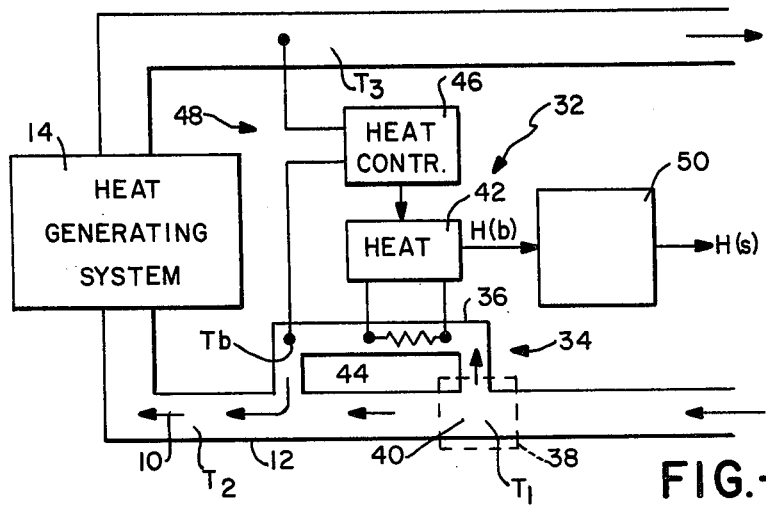
FIG.—4
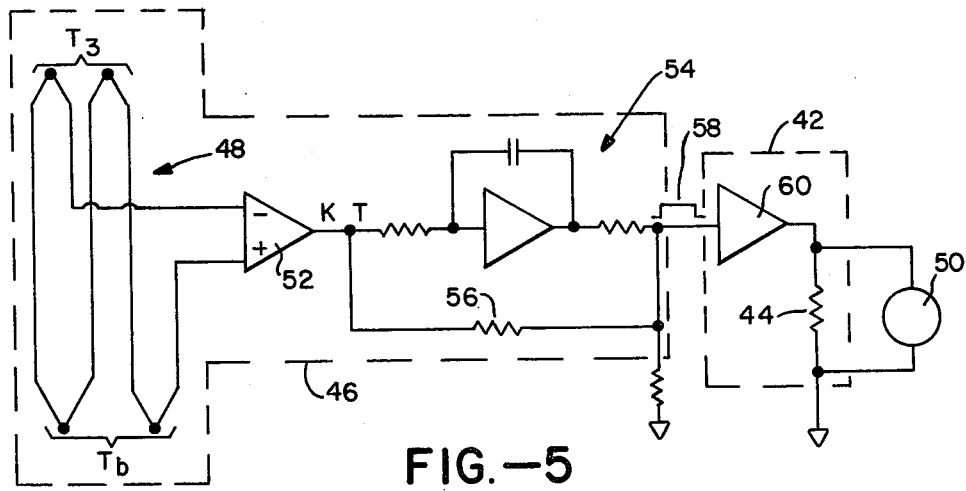
FIG.—5
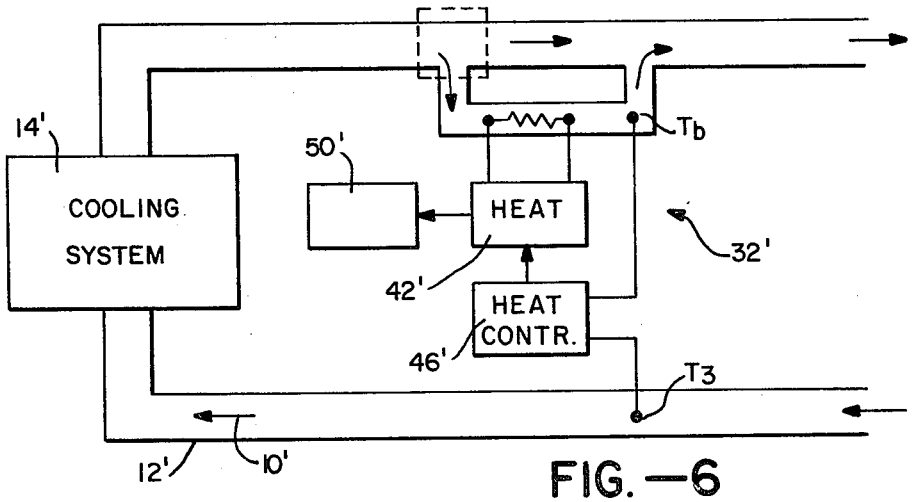
FIG.—6

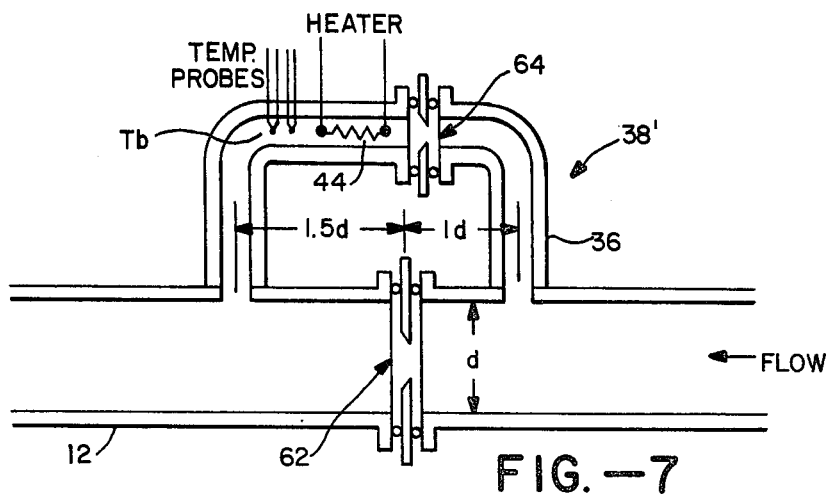
FIG.—7
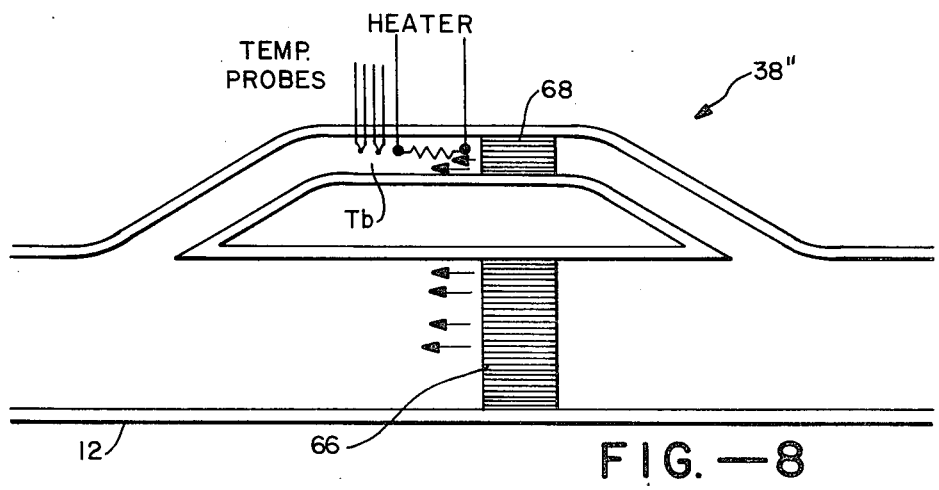
FIG.—8
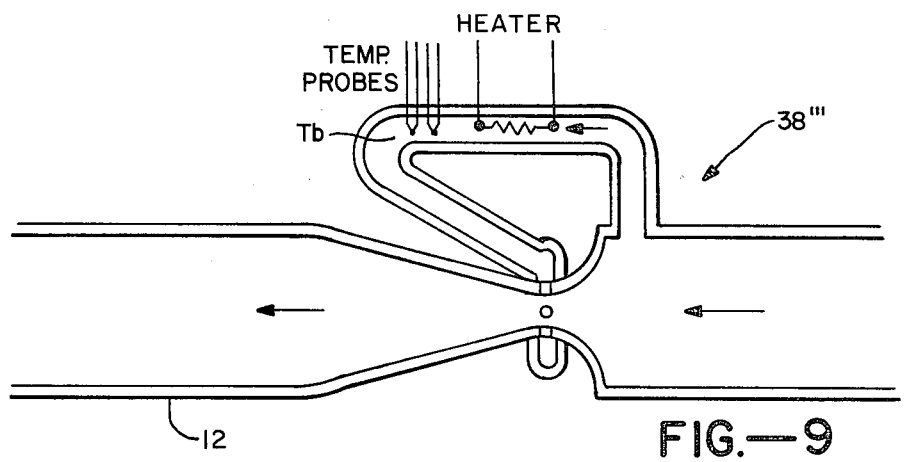
FIG.—9

HEAT MEASURING APPARATUS AND METHOD FOR USE IN A CONTINUOUS FLUID STREAM

The present invention relates generally to a technique for use in measuring the amount of heat entering or being withdrawn from a continuous fluid stream at a specific location along its path and more particularly to a technique for accomplishing this in fluids having density, viscosity and specific heat properties which vary in an unknown manner. Examples of such fluids are water-/antifreeze solutions and moist air.

Present conventional techniques for measuring heat (enthalpy) rates in a fluid flow sytem require the accurate measurement of the difference in temperature of the fluid stream between points upstream and downstream of the location where heat is either entering or being removed from the stream. This is because the heat (enthalpy) in question follows the equation:

$$H_{(s)} = \Delta T m C_p \quad (1)$$

where $\Delta T$ is the differential temperature referred to above in °F., m is the mass flow rate of the fluid in lbs/minute and $c_p$ is the specific heat of the fluid in BTUs/lb/°F. For reasons to become apparent hereinafter, it is to be noted that the mass flow rate m is equivalent to the product of volumetric flow rate V (gals/min) and density $\rho$ (lbs/gallon), that is $$m = V \times \rho \quad (2)$$

One conventional technique for measuring the heat rate entering a stream of fluid of known specific heat and density (as functions of temperature) is illustrated in FIG. 1. This figure depicts a continuously flowing stream of the fluid by means of arrows 10 following a path 12 determined by appropriate piping, tubing or the like. A heat generating system, for example a solar panel, is generally indicated at 14 at a predetermined location along path 12. Heat generated from this system, for example solar heat, enters stream 10 and it is this heat which is to be measured. Since the fluid, e.g. water, has a known specific heat $C_p$ and a known density $\rho$ (again as a function of temperature), as stated above, it is only necessary to measure the temperature differential $\Delta T$ and the volumetric flow rate V. As seen in FIG. 1, a conventional displacement meter generally indicated at 16 is located in the fluid stream 10 at a point upstream from the generating system 14 for measuring the stream's volumetric flow rate and providing a corresponding output. At the same time, a conventional device 18, for example a thermistor bridge or thermopile arrangement, is provided for measuring the difference in temperature of the stream at points upstream and downstream of system 14 as indicated at $T_{(u)}$ and $T_{(d)}$ and producing a corresponding output. The outputs from displacement meter 16 and device 18 are applied to a suitable multiplying circuit 20 which may include the necessary constant to take into account density and specific heat (which are known) for ultimately arriving at a heat rate (enthalpy) $H_{(s)}$ attributed to the system 14.

In the case where the density of the fluid in question varies and cannot be easily measured or inferred, a conventional meter for measuring mass flow rate can be used in place of displacement meter 16, as illustrated in FIG. 2. As seen there, a mass flow meter generally indicated at 22 is positioned in stream 10 in the same place as displacement meter 16 shown in FIG. 1. Meter 22 generates an appropriate output corresponding to the mass flow rate m of the fluid and this output is applied to the input of a conventional multiplying circuit 20' which also received at $\Delta T$ output from device 18. In this way, the product of the two is provided and can be modified to take into account specific heat $C_p$ for indicating the heat rate $H_{(s)}$ as indicated in FIG. 2.

In the two techniques just described the specific heat $C_p$ of the fluid is known. In the case where this parameter is not known, an alternative technique must be used, for example the known technique illustrated in FIG. 3. There, instead of using either a displacement meter or a mass flow meter, a constant heat source 24 is used to apply a constant amount of heat to fluid stream 10 at a point on path 12 upstream from system 14 and $T_{(u)}$, as indicated by the heating coil 26. At the same time, a device 28 is provided for measuring the temperature differential $\Delta T'$ at points immediately upstream and downstream from the heating coil 26. This device may be identical to previously described device 18 which is also utilized in this technique as described previously. The output from constant heat source 24, which output corresponds to the amount of heat applied to the stream, and the output from $\Delta T'$ are applied to a circuit 30 which divides the amount of heat applied to the stream by the differential temperature $\Delta T'$ to provide an output corresponding to the product of the mass flow rate m and specific heat $C_p$ in accordance with equation (1) above. This output is applied to a suitable circuit 20'' which also receives the differential temperature output $\Delta T$ for providing its own output corresponding to the heat rate $H_{(s)}$ attributed to system 14.

The disadvantages in the techniques depicted in FIGS. 1 and 2 reside in the fact that they cannot be used in measuring the heat rate of a fluid stream in which the specific heat of the fluid is unknown. While the technique shown in FIG. 3 does not require that the specific heat of the fluid be known, this particular technique has its own disadvantages. First, a large amount of power must be dissipated in heating the fluid to obtain a temperature differential $\Delta T'$ sufficiently large to be accurately measured. Second, at low values of the system heat $H_{(s)}$ (attributed to system 14), the heat entering the stream from source 24 may be of the same magnitude as the system heat $H_{(s)}$, thereby substantially affecting the system being measured or a related process associated with system 14. These disadvantages can be overcome by using a constant ratio bypass section to which heat is applied from the source 24 and along which the temperature differential $\Delta T'$ is measured. This constant ratio "fluid bridge" concept is known in the art. The difference between this technique and the one illustrated in FIG. 3 resides in the use of a bypass technique so as not to affect the overall system even when the system heat rate is relatively low. In this regard, it should be apparent that the ratio between the bypass stream and the main stream must be taken into account when this technique is used to generate a signal corresponding to the system heat rate $H_{(s)}$. In addition, in order to provide an accurate measurement using this bypass technique, it is critical that the fluid entering the bypass channel and the fluid not entering it be at the same temperature and pressure at the point of entry to the bypass channel.

Even though the bypass technique just discussed overcomes the specifically recited disadvantages to the technique illustrated in FIG. 3, each of these techniques requires two different temperature differentials $\Delta T$ and ΔT' which itself is a disadvantage. Other disadvantages include the need for both differential temperature measurements to be linear over the wide range of absolute temperatures encountered in most applications, and the need to divide ΔT by ΔT' in order to obtain $H_{(s)}$.

In view of the foregoing, one object of the present invention is to provide an uncomplicated and reliable technique for use in measuring the amount of heat entering (or leaving) a continuously flowing fluid stream even if its density, viscosity and specific heat, vary in unknown ways, as in the case of water/antifreeze solutions, moist air and the like.

Another object of the present invention is to provide a heat measuring technique of the type just recited and specifically one which uses a secondary supply of heat and also the constant ratio fluid bridge concept described but which does not require the utilization of two different temperature differentials.

Another object of the present invention is to minimize the effect which flow measurement at position 16 has on the process (e.g. temperature rise and/or pressure drop in the direction of flow across the flow water).

As will be seen hereinafter, the technique disclosed herein is one which is especially suitable for use in measuring the amount of heat entering a continuously flowing fluid stream at a predetermined location along the path of the stream from a heat generating system, as in the case of the techniques illustrated in FIGS. 1, 2 and 3. Moreover, the present technique utilizes the previously recited constant ratio fluidic bridge concept for diverting a fixed portion of the fluid stream from its path at a specific diversion point and returning the stream portion back to its path along a bypass route upstream of the heat entering location. At the same time, heat is applied to the diverted stream portion at a fixed point along its bypass route, as in the case of the bypass technique described above. However, in accordance with the present invention, the present technique utilizes a heat control arrangement including means for detecting the difference in temperature between the continuous stream at a fixed point on its path downstream of the heat entering location and the diverted stream portion at a fixed point along its bypass route downstream of the heat applying point. The heat control arrangement also includes means responsive to the temperature difference detected for controlling the amount of het applied to the diverted stream portion so as to substantially eliminate the difference, that is to maintain the temperatures detected at the two points equal to one another. The amount of heat necessary to eliminate the temperature differential is measured. As will be seen hereinafter, this heat is proportional to the amount of system heat entering the continuous stream by a fixed known amount and, hence, the system heat can be readily determined. In this regard, as will also be seen hereinafter, the technique disclosed herein can also be used in measuring the amount of heat removed from a continuous fluid stream by means of a cooling system.

Referring now to the drawings:

FIG. 1 is a diagrammatic illustration of a prior art technique of measuring the heat in a continuously flowing fluid stream when the specific heat and density of the fluid (as functions of temperature) are known, as discussed previously;

FIG. 2 is a diagrammatic illustration of a prior art technique of measuring heat rate in a continuously flowing fluid stream when the density of the fluid varies and can not be easily inferred, as discussed previously;

FIG. 3 is a diagrammatic illustration of a prior art technique for measuring heat rate in a continuously flowing fluid stream when the specific heat of the fluid is unknown, as discussed previously;

FIG. 4 is a diagrammatic illustration of a technique for measuring the heat rate in a continuously flowing fluid stream, in accordance with the present invention;

FIG. 5 is a schematic illustration of specific components in the heat measuring technique shown in FIG. 4;

FIG. 6 is a diagrammatic illustration of a technique for measuring the amount of heat withdrawn from a continuously flowing fluid stream in accordance with the present invention;

FIG. 7 is a diagrammatic illustration of one form of constant ratio fluid flow divider (fluidic bridge) utilized in the technique of FIG. 4;

FIG. 8 is a view similar to FIG. 7 but illustrating another form of flow divider which can be used as part of the technique of FIG. 4; and FIG. 9 is a similar view to FIGS. 6 and 7 showing still another form of flow divider for use in the technique of FIG. 4.

Having discussed the heat measuring techniques illustrated in FIGS. 1 to 3 previously, attention is immediately directed to FIG. 4 which illustrates a heat measuring technique designed in accordance with the present invention. Like the previous techniques, the present technique is one which operates on a continuously flowing fluid stream 10 along a suitably provided path 12. The same heat generating system 14 illustrated in FIGS. 1 to 3 is also shown in FIG. 4. As will be seen below, the technique depicted in FIG. 4 utilizes an overall apparatus 32 for measuring the amount of heat entering the stream at system 14.

Referring specifically to FIG. 4, heat measuring apparatus 32 is shown utilizing a fluid bypass arrangement 34 including a bypass loop 36 joining the main stream 12 upstream of heat generating system 4 and a constant ratio fluid flow dividing device, e.g. a fluidic bridge, generally indicated by dotted lines at 38. Device 38 serves to divert a fixed portion of the fluid stream 10 into the bypass loop from path 10 at the diversion point 40. The fluid entering the bypass loop at this point exits at a point downstream therefrom but still upstream from system 14. Any suitable device 38 may be utilized so long as it divides the flow in accordance with a substantially constant ratio. Also, the fluid entering the bypass loop at the diversion point and the fluid remaining in the main stream at that point must be substantially the same pressure and temperature, the latter being indicated at $T_1$. Specific examples of suitable devices 38 will be discussed hereinafter with respect to FIGS. 7 to 9.

In addition to arrangement 34, overall apparatus 32 uses a variable heat source generally indicated at 42 and including a heating coil 44 located within the bypass loop 36 for applying heat to the diverted stream of fluid at a fixed point along the bypass route for raising its temperature to $T_b$. The heated fluid returns to the main stream, resulting in the temperature of the latter being indicated at T2. A heat control assembly 46 is provided as part of overall apparatus 32 and serves two purposes. First it includes an arrangement of suitable temperature responsive means, for example thermopiles or thermistors generally indicated at 48 for detecting the difference in temperature between the temperature of the continuous stream 10 at a fixed point T3 on path 12 downstream of system 14 and the temperature of the diverted stream at a fixed point ($T_b$) along bypass route 36 downstream of coil 44. Assembly 46 also includes suitable circuitry which is exemplified in FIG. 5 to be described hereinafter and which is responsive to the temperature difference detected by arrangement 48 for controlling the amount of heat applied to the diverted stream by means of source 42 so as to substantially eliminate the temperature difference, that is, so that the temperature $T_b$ is equal to the temperature $T_3$.

In addition to bypass arrangement 34, heat source 42 and heat control assembly 46, overall apparatus 32 includes suitable means generally indicated at 50 for measuring the amount of heat applied to the diverted stream. As will be seen hereinafter, this heat is proportional by a fixed amount to the heat entering stream 10 from system 14. More specifically, as will be seen hereinafter, the amount of heat $H_{(s)}$ entering the main stream 10 as a result of system 14 follows the following equation:

$$H_{(s)} = R \times H_{(b)} \tag{3}$$

where R is the ratio of the mass flow rate of the fluid not entering the bypass loop at diversion point 14 to the mass flow rate of the fluid entering the loop and $H_{(b)}$ is the heat from source 42. Since this ratio is fixed, the circuitry making up means 50 can be calibrated to reflect this constant and provide an output corresponding to the system heat $H_{(s)}$, as indicated at the output of means 50 in FIG. 4.

Having described apparatus 32 from both structural and functional standpoints as illustrated in FIG. 4, attention is now directed to the way in which the relationship between the added bypass heat $H_{(b)}$ and the system heat $H_{(s)}$ in equation (3) above is derived. As stated, the fluid flow device 38 splits the flowing fluid into what may be referred to as a main stream having a mass flow rate $m_m$ and a bypass stream having a mass flow rate $m_b$. Because the flow divider is of a constant ratio type, as stated previously, the following ratios are obtained:

$$R_m = m_m/m_t \text{ and } R_b = m_b/m_t = (m_t - m_m)/m_t \tag{4}$$

These ratios $R_m$ and $R_b$ can be made quite constant and repeatable over a wide range of flow rates and flow properties (kinematic viscosity being the property of chief concern). In this regard, it is critical that the fluid entering the flow divider at its diversion point, that is at the upstream end of the bypass loop, and the fluid not entering the bypass loop at this point are at the same state of temperature and pressure. This is generally the case, although instances when it is not true are for example when an uninsulated tube upstream of the diversion point causes the fluid to be cooled in a non-uniform manner such that the fluid temperature near the tube wall is cooler than the average fluid temperature and it is mainly this cooler fluid which enters the bypass channel.

Since the fluid enters both legs of the flow divider in the same state, the ratios $R_m$ and $R_b$ apply to the ratios of volumetric and thermal capacitance rate as well. In other words $$\rho_m = \rho_b = \rho_t \text{ and } c_{pm} = c_{pb} = c_{pt} \tag{5}$$

The symbol $\rho$ corresponds to density and $c_p$ to thermal capacitance per unit mass (specific heat). Therefore:

$$R_m = m_m/m_t = V_m/V_t = (m\ c_p)_m/(m\ c_p)_t \tag{6a}$$

and $$R_b = m_b/m_t = V_b/V_t = (m\ c_p)_b/(m\ c_p)_t \tag{6b}$$

The symbol V represents the volumetric flow rate. The bypass mass flow rate $m_b$ having entered the bypass loop is heated by element 44 until its temperature $T_b$ equals the temperature downstream from the heat generating system, that is, at $T_3$. The bypass fluid is then remixed with the main stream at temperature $T_1$ resulting in the temperature $T_2$. Therefore, the "mixed" fluid enters the generating system at a temperature $T_2$ in accordance with equation (7) below:

$$T_2 = (m_m T_1 + m_b T_b)/m_t = R_m T_1 + R_b T_3 \tag{7}$$

Equation (7) assumes either that the thermal capacitance $c_p$ is relatively constant with temperature or that the ratio $R_b$ is substantially smaller that the ratio $R_m$. In fact, both conditions can be easily met, the former being in general a fact of nature and the latter being achieved by design.

In view of the foregoing the heat $H_b$ from source 42 required to have temperature $T_b$ track the temperature $T_3$ so as to maintain a zero differential between the two is as follows:

$$H_{(b)} = (T_3 - T_1)\ m_b\ c_p \tag{8}$$

The process heat to be measured is:

$$H_{(s)} = (T_3 - T_2)\ m_t\ c_p \tag{9}$$

Noting that $R_m + R_b = 1$, and using the definition of $T_2$ given by equation (7) we can write:

$$H_{(s)} = (T_3 R_m + T_3 R_b - T_1 R_m - T_3 R_b)\ m_t\ c_p \tag{10}$$

$$H_{(s)} = (T_3 R_m + T_1 R_m)\ m_t\ c_p \tag{11}$$

$$H_{(s)} = (T_3 - T_1)\ m_m\ c_p \tag{12}$$

combining equation (12) with equation (8) to eliminate $(T_3 - T_1)c_p$ yields:

$$H_{(s)} = (m_m/m_b)H_{(b)} = (R_m/R_b)H_{(b)} \tag{13}$$

In view of the foregoing, it should be apparent that it is only necessary to know the fluidic bridge constant R and to measure $H_{(b)}$ as described above with respect to apparatus 32.

The combination of components including necessary circuitry making up the source 42 and heat control arrangement 46 including its temperature sensing means 48 can be readily provided by those with ordinary skill in the art to which the present invention pertains, in view of the teachings disclosed herein. Nevertheless attention is directed to FIG. 5 which illustrates a specific embodiment of the heat source and heat control assembly and the way in which means 50 may be interconnected with the source. It is to be understood that the specific components to be described generally below may themselves be readily provided. As seen in FIG. 5, arrangement 48 takes the form of a thermopile including two pair of thermocouple junctions; two negative junctions which serve to sense the temperature $T_b$ and two positive junctions which serve to sense the temperature $T_3$. The thermopile's output is connected to the inputs of a differential amplifier 52 having a responsive output $k\Delta T$ where $\Delta T$ is the difference between the temperature $T_3$ and $T_b$ (e.g. $T_3-T_b$) and K is a constant gain factor. This output is applied to a parallel circuit including a signal integrator 54 and a parallel fixed resistor 56. The output signal from this parallel circuit indicated generally at 58 is equal to the following:

$$K_1 \int \Delta T dt + K_2 \Delta T \qquad (14)$$

where $K_1$ is an integrating constant associated with the integrating circuitry and $K_2$ is a constant associated with the resistor 56.

As seen in FIG. 5, output signal 58 which corresponds to the (recent average) difference in temperature between the points $T_3$ and $T_b$ is applied to the input of a power amplifier 60 comprising part of heat source 42 along with heating coil 44. The power amplifier is connected to a suitable source of power (not shown) and energizes the heating coil 44 in response to and depending upon the magnitude of signal 58 until the temperature at $T_b$ is equal to the temperature at $T_3$, thereby eliminating any difference in temperature between the two points. At that time, the output signal 58 goes to zero and the heating coil is de-energized. As also seen in FIG. 5, the heat measuring means 50 generally illustrated in FIG. 4 is comprised of a meter, for example an integrating volt meter or power meter connected in parallel with the heat element 44, as is known in the art. The meter can be calibrated to include the previously recited ratio R in Equation (13) above so that the output of the meter actually reflects the system heat $H_{(s)}$.

Having described apparatus 32 and one specific embodiment thereof, attention is directed to FIG. 6 which illustrates an apparatus 32′ provided for measuring the amount of heat withdrawn from the continuous stream of flowing fluid 10′ by means of a cooling system 14′. The fluid is confined to a path 12′ as in FIG. 4.

Apparatus 32′ may be quite similar to apparatus 32 with respect to operative components and therefore includes a similar bypass arrangement 34′, a similar heat source 42′ and a similar heat control arrangement 46′. However, in the case of apparatus 32′ its bypass arrangement is located on the downstream side of path 12′ with respect to cooling system 14′ as seen in FIG. 6. This also reverses the positions of the temperature measuring points $T_b$ and $T_3$. From an operational standpoint, the amount of heat used to maintain a zero differential between the temperature of $T_3$ and the temperature at $T_b$ corresponds to the amount of heat withdrawn from stream 10′ by cooling system 14′. In this regard, a means 50′ similar to previously recited means 50 is also provided as part of apparatus 32′ for measuring the amount of heat generated by source 42′.

Having described apparatus 32 and apparatus 32′, attention is now directed to FIGS. 7, 8 and 9 which illustrate different embodiments of previously recited flow divider 38. In FIG. 7, a constant ratio, nonrecovering device generally indicated at 38′ is shown. This device uses a constriction element such as an orifice plate or nozzle generally indicated at 62 in the main path, that is, in path 12 and a similar element 64 in its bypass loop 36. Note that the heater element 44 and the $T_b$ section of the differential temperature bridge are located downstream of element 64.

The second type of constant ratio flow dividing device is shown in FIG. 8 at 38″. This particular device uses laminar flow elements 66 and 68 in its main stream and bypass stream, respectively. Device 38″ is also a nonrecovering device, that is, there is a loss of pressure across it. Kinetic energy recovery devices can not be used in the bypass channel, although a venturi may find application in the main channel when low pressure loss is required as in the device 38‴ as is shown in FIG. 9. There the bypass loop forms a venturi at the reduced cross section of the main stream.

While three particular types of flow dividing devices have been shown, it is to be understood that the present invention is not limited to those particular configurations. In this regard, it is also to be understood that one with ordinary skill in the art to which the present invention pertains could readily provide a suitable flow dividing device in view of the teachings herein. To this end, the main and bypass flow elements should be designed to be dynamically similar over the range of fluid properties and flow rates expected. The flow ratio which results in identical pressure drops across the two elements is then determined simply by a geometrical scale factor. In conflict with these requirements for dynamic similarity over a wide range of property and flows is the desirability of making a bypass flow ratio $R_b = m_b/m_t$ as small as possible so that the heat $H_{(b)}$ added into the system is as small as possible (compared to the system $H_{(s)}$) and so that the overall apparatus 32 (or 32′) affects the process as little as possible. It is also desirable to make the pressure drop relatively small. One can reasonably expect to obtain a bypass ratio, $R_b$, from 0.02 down to 0.001 at high total flow rates $m_t$. The simplest practical flow elements would be the non-recovery types using constrictions such as nozzles or the orifice plates in the device illustrated in FIG. 7 or the non-recovery type using laminar flow elements shown in FIG. 8. Kinetic energy recovery devices can not be used in the bypass channel as stated previously, although, as also stated, a venturi may find application in the main channel when low pressure loss is required as in the device shown in FIG. 9. In this regard, it may be easier to obtain dynamic similarity over a wide range of flow conditions by using laminar elements, but constriction elements have the advantage of presenting the bypass heater with a highly turbulent flow which helps achieve uniform temperature at the bypass sensing point $T_b$.

What is claimed is:
1. An apparatus for use in measuring the amount of heat entering a continuous fluid stream at a predetermined location along the path of said stream from a heat generating system, said apparatus comprising:
(a) means for diverting a fixed portion of said fluid stream from said path at a specific diversion point and returning said stream portion back to said path along a bypass route upstream of said heat entering location, said diverting means being such that the fluid entering the bypass route and the fluid remaining in the continuous stream at said diversion point have substantially the same pressure and temperature, said diversion means including a plurality of laminar flow elements together forming a flow dividing arrangement which is located at said diversion point and which has a bypass section through which the diverted portion of said stream passes and a main section through which the rest of said stream passes;

(b) means for applying heat to said diverted stream portion at a fixed point along said bypass route;
(c) a heat control arrangement including
  (i) means for detecting the difference in temperature between the continuous stream at a fixed point on said path downstream of said heat entering location and the diverted stream portion at a fixed point along said bypass route downstream of said heat applying point, and
  (ii) means responsive to the temperature difference detected for controlling the amount of said heat applied to said diverted stream portion so as to substantially eliminate said difference; and
(d) means for measuring the amount of heat applied to said diverted stream portion, said applied heat being proportional by a fixed amount to the heat entering said continuous stream from said generating system whereby the latter can be determined.

2. An apparatus according to claim 1 wherein said bypass route extends vertically upward from said continuous stream at said diversion point.

3. An apparatus for use in measuring the amount of heat entering a continuous fluid stream at a predetermined location along the path of said stream from a heat generating system, said apparatus comprising:
(a) means for diverting a fixed portion of said fluid stream from said path at a specific diversion joint and returning said stream portion back to said path along a bypass route upstream of said heat entering location, said diverting means being such that the fluid entering the bypass route and the fluid remaining in the continuous stream at said diversion point have substantially the same pressure and temperature, said diverting means including a flow dividing arrangement which is located at said diversion point and which has a bypass section through which the diverted portion of said stream passes and a main section through which the rest of said stream passes, said main section including therein means for creating a venturi so as to provide said diverted stream portion;
(b) means for applying heat to said diverted stream portion at a fixed point along said bypass route;
(c) a heat control arrangement including
  (i) means for detecting the difference in temperature between the continuous stream at a fixed point on said path downstream of said heat entering location and the diverted stream portion at a fixed point along said bypass route downstream of said heat applying point, and
  (ii) means responsive to the temperature difference detected for controlling the amount of said heat applied to said diverted stream portion so as to substantially eliminate said difference; and
(d) means for measuring the amount of heat applied to said diverted stream portion, said applied heat being proportional by a fixed amount to the heat entering said continuous stream from said generating system whereby the latter can be determined.

4. An apparatus according to claim 3, wherein said bypass route extends vertically upward from said continuous stream at said diversion point.

* * * * *